United States Patent [19]

Takeuchi et al.

[11] 4,354,301
[45] Oct. 19, 1982

[54] METHOD FOR MANUFACTURING STRIPE-PATTERNED METAL PLATE

[75] Inventors: Yo Takeuchi, Urawa; Masaki Morikawa, Oomiya; Chuji Tanaka; Toshiharu Hiji, both of Ageo; Hiroshi Ikeda, Osaka, all of Japan

[73] Assignee: Mitsubushi Kinzoku Kabushiki Kaisha, Tokyo, Japan

[21] Appl. No.: 296,153

[22] Filed: Aug. 25, 1981

Related U.S. Application Data

[63] Continuation-in-part of Ser. No. 75,256, Sep. 13, 1979, abandoned.

[51] Int. Cl.³ ............................................. B23P 13/00
[52] U.S. Cl. ..................................... 29/160.6; 29/19; 29/423; 228/158; 228/160; 228/190; 228/243
[58] Field of Search .............. 228/160, 158, 178, 190, 228/243; 29/17, 19, 160.6, 423; 72/365

[56] References Cited

U.S. PATENT DOCUMENTS

| | | | |
|---|---|---|---|
| 3,063,137 | 11/1962 | Leach | 29/160.6 |
| 3,165,824 | 1/1965 | Barney | 29/160.6 |
| 3,165,825 | 1/1965 | Barney | 29/160.6 |
| 3,682,606 | 8/1972 | Anderson et al. | 228/190 |
| 3,848,319 | 11/1974 | Hendrickson | 29/423 |
| 3,938,723 | 2/1976 | Slaughter | 29/423 X |

Primary Examiner—Kenneth J. Ramsey
Attorney, Agent, or Firm—Darby & Darby

[57] ABSTRACT

There is disclosed a method for manufacturing a stripe-patterned metal plate or composite material. Plural kinds of metal sheet blanks having different colors are placed one upon another to provide a layer structure. The metal sheets of the layer structure are bonded to each other directly and metallurgically in a solid state to provide a layer-structured plate. The layer-structured plate is cut in a direction along a face extending at a predetermined angle to a layer face thereof to provide at least one thin metal plate intermediate. The metal plate intermediate is inserted into a complementary hole formed through a solid package of metal. Then, the package containing the metal plate intermediate is hot rolled into a predetermined length with its width remaining substantially unchanged so that the metal plate intermediate is simultaneously extended at a predetermined reduction rate with its width remaining substantially unchanged.

12 Claims, 16 Drawing Figures

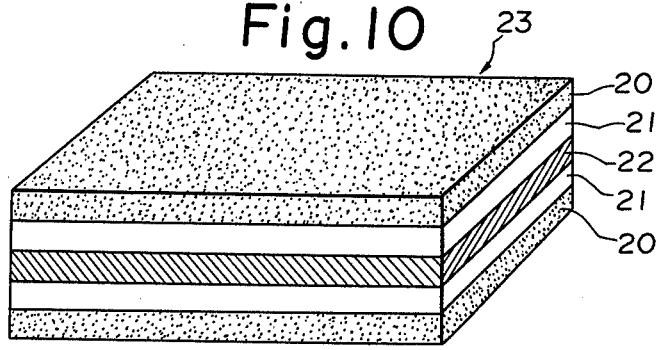
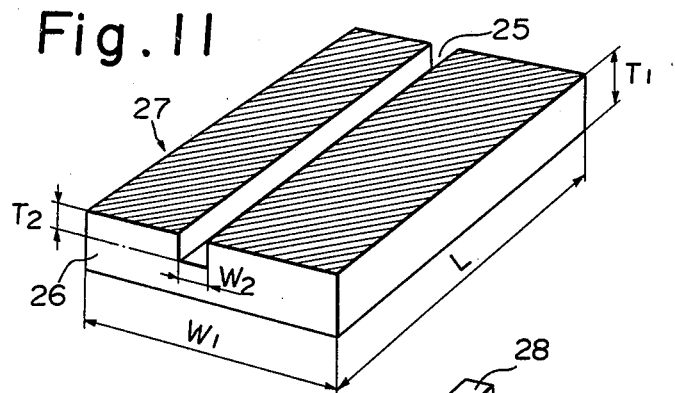
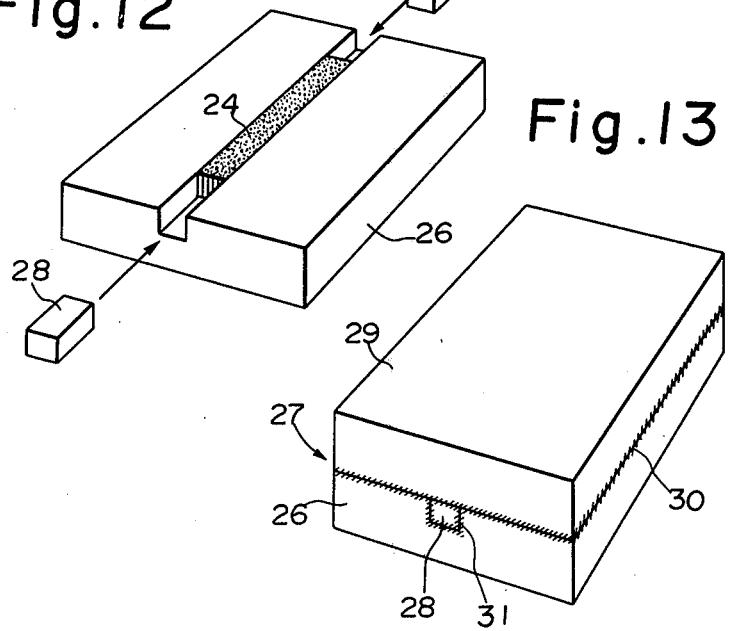

METHOD FOR MANUFACTURING STRIPE-PATTERNED METAL PLATE

This is a continuation-in-part of application Ser. No. 075,256 filed Sept. 13, 1979 and now abandoned.

BACKGROUND OF THE INVENTION

1. Field of the Invention

The present invention relates to a method for manufacturing a stripe-patterned metal plate which has a stripe pattern brought about by the arrangement of different kinds of metal sheet blanks, each of which has a colour different from the other. Further the present invention is concerned with a clad plate having a stripe pattern, manufactured by placing on a matrix metal plate a stripe-patterned metal plate prepared in the aforesaid method and integrally bonding both metal plates.

2. Description of the Prior Art

Hithereto, for manufacturing personal ornaments, adornments and other industrial art objects such as watch bands, bracelets, cigarette lighters, brooches, rings, buckles, cigarette cases, pendants, neck tie pins, cuffs buttons or the like, usually a clad plate is used and the clad plate is constructed of different kinds of metal plates, each of which has a colour different from the other.

Before describing the present invention, the conventional clad plates will be briefly described below with reference to FIG. 1 to 5.

Typical clad plates are as illustrated in FIG. 1 to 3 and are manufactured by placing cladding plate B on a matrix plate A of metal material different from that of said cladding plate B and then integrally bonding both metal plates by way of pressing, soldering or the like.

The clad plate as designated by the reference numeral 1 in FIG. 1 is referred to as a full clad plate, while the clad plate as designated by the reference numeral 2 in FIG. 2 is a so-called inlay type clad plate which is constructed of a matrix plate A and a cladding plate B placed thereon, said cladding plate B extending in the longitudinal direction and having the exposed areas of the matrix plate A on the both sides thereof.

Such simple structured clad plates as illustrated in FIG. 1 and 2 can be manufactured with less difficulty by placing the cladding plate B on the matrix plate A in an appropriate manner and then rolling the layer assembly of the both plates.

In the case of clad plate 3 in FIG. 3, however, where several strips of cladding plate B extend in the longitudinal direction so as to provide a different type of stripe pattern, multi-layer rolling is difficult to be carried out. The finer the stripe pattern is, the more difficult the rolling operation becomes. If three strips of cladding plate B of gold alloy are placed on a matrix plate A of stainless steel with a distance of 2 to 5 mm between each strip, multi-layer rolling is unsatisfactorily conducted as illustrated in FIG. 4, and causes the cladding plates B to be deformed into a snake-like motion pattern. Thus it is almost impossible with the conventional method to manufacture a clad plate with such a fine stripe pattern without any deformation or distortion.

To prevent such deformation or distortion in a stripe pattern it was proposed that a plurality of grooves 4 (see FIG. 5) be formed on the matrix plate A to receive the cladding plates B therein and the layer assembly of the matrix plate A and cladding plates B would be subjected to a rolling operation. It is recognized with this improved conventional method, however, that as the rolling operation is conducted, the cladding plates B tend to overflow the grooves, resulting in an irregular stripe pattern if fine cladding plates B having a width, for instance, of less than 2 mm, are extended with a narrow clearance therebetween. Therefore, plating is employed if finer stripe pattern is required. A drawback of the plating method, however, is that peeling-off takes place over the plated area during the course of plastic deformation, such as bending operations or the like.

U.S. Pat. No. 3,165,824 discloses a method of producing a stripe-patterned composite material. This method is not entirely practical and satisfactory in that the metal intermediate plate is rolled in such a manner that the resultant composite material frequently has the stripes which are not fully straight, i.e., somewhat serpentine. In addition, the metal intermediate plate of a rectangular cross-section sometimes falls to be rolled into a rectangular cross-section, that is to say, it is rolled into a rhombic cross-section.

U.S. Pat. No. 3,165,825 discloses a method of producing a helical patterned composite material. The metal intermediate plate of a rectangular cross-section is rolled by a pair of grooved rolls into a cross-sectionally circular rod. The use of the grooved rolls requires a relatively long metal intermediate plate. When a relatively short metal plate intermediate is to be rolled by such grooved rolls, at least one end portion of the metal plate intermediate has to be held by a suitable gripping means. As a result, the non-processed end portion of the metal plate intermediate, serving as the gripping portion, is not used as a final product. This is quite undesirable from an economic point of view particularly when precious metals such as 18 K gold alloys are used to produce the composite material. Another disadvantage is that when the metal plate intermediate of a short length is hot rolled using such grooved rolls, it becomes cooled rapidly. As a result, the hot rolling is not carried out efficiently.

In view of this background, an improved method for manufacturing a stripe-patterned metal plate having a stripe pattern provided by cladding and not by plating has been looked for, with the stripe pattern being excellent in strength and wear resistance and strong enough to withstand heavy plastic deformation.

SUMMARY OF THE INVENTION

Thus the present invention is intended to eliminate the aforesaid drawbacks with the conventional methods and provide an improved method for manufacturing a stripe-patterned metal plate by way of cladding, which has not only a rough stripe pattern but also a very fine stripe pattern, said improved method comprising the steps of placing a plurality of different metal sheet blanks into a layer structure in an alternate order or in predetermined order of arrangement, integrally bonding the respective metal sheet blanks to each other by way of cladding so that an integrally bonded layer-structured plate is produced, cutting said integrally bonded layer-structured plate in the direction along a face extending at a predetermined angle to the layer face thereof so as to take a thin metal plate intermediate having a predetermined width therefrom, the cut faces of said metal plate intermediate having the required stripe pattern owing to the arrangement of said metal sheet blanks, and cold rolling said metal plate intermediate to a predetermined thickness with both cut faces of said metal plate intermediate located in a horizontal direction.

Generally a stripe-patterned metal plate is manufactured by using two kinds of metal sheet blanks having different colour. Particularly, when a stripe pattern having alternate white and red colours is required, preferably SUS 304 stainless steel in accordance with Japanese Industrial Standard (hereinafter referred to as JIS SUS 304 stainless steel) is employed for sheet metal blanks with which white colour is generated, while oxygen-free copper is employed for metal sheet blanks with which red colour is generated.

In another combination of different kinds of sheet metal blanks it is proposed that as the sheet metal blank for generating white colour, white gold having a chemical composition of about 50% Au and about 50Ni is used, while another sheet metal blank for generating yellow colour, 12 K gold alloy having a chemical composition of about 50% Au, about 35% Cu, about 10% Ag and about 5% Zn is used.

In another preferred combination of different kinds of sheet metal blanks it is proposed that as sheet material blank for generating white colour consisting of JIS SUS 316 L stainless steel is used, while another sheet metal blank for generating yellow colour, 12 K gold alloy having the same chemical composition, as that of the preceding combination is used.

After the sheet metal blanks are placed one above another, they are preferably bonded to each other to form an integrally bonded layer-structured plate, while they are kept hot at an elevated temperature in dependence on their material. Specifically, in case of the aforesaid first combination of sheet metal blanks bonding is carried out at the condition of 900° C. of temperature and 50% reduction rate and in case of the aforesaid second combination the required bonding is achieved in a form of diffusive bonding by holding the layer structure of the sheet metal blanks at a temperature of 750° C. for 1 hour in the vacuum of $10^{-3}$ torr. Further, in case of the aforesaid third combination the required bonding is obtained by way of hot pressing at about 730° C. and about 50% reduction rate.

After the respective sheet metal blanks are placed one above another and then integrally bonded to each other in the above described manner, the integrally bonded layer-structured plate is subjected to cutting along a face extending at a selected angle to the layer face thereof. Usually, cutting is carried out in the direction at a right angle to said layer face.

Further it is possible to manufacture a rigid clad plate having the required stripe pattern by way of placing on a matrix plate of, for instance, stainless steel, the stripe-patterned metal plate provided in the above described manner and then integrally bonding both metal plates.

According to an important aspect of the present invention, a package of metal in provided for containing a metal plate intermediate therein. The package is made preferably of soft steel and comprises a pair of upper and lower blocks, the lower block having one or more grooves or holes extending along its length. The metal plate intermediate is inserted into the groove, and the upper block is placed on the lower block. Then, the upper and lower blocks are bonded together by welding. Then, the package is hot rolled at a predetermined reduction rate so that the metal plate intermediate is extended uniformly into a predetermined length with its width remaining substantially unchanged. This method using the package is best suited for producing a relatively short composite material because no gripping portion is necessary at the hot rolling. By virtue of the provision of the package, the stripes of the resultant composite material are not deformed or distorted. Also, the metal plate intermediate of a rectangular cross-section is rolled into a rectangular cross-section, not into a rhombic cross-section. Further, the metal plate intermediate of a relatively short length can be maintained at a required temperature during the hot rolling due to the provision of the package.

Thus it is an object of the present invention to provide a method for manufacturing a stripe-patterned metal plate which has not only a rough stripe pattern but also a very fine stripe pattern without any peeling-off or other failure upon heavy plastic deformation.

It is another object of the present invention to provide a method for manufacturing a stripe-patterned metal plate which has a beautiful appearance without any distortion or deformation.

It is another object of the present invention to provide a method for manufacturing a stripe-patterned metal plate, comprising a plurality of simple manufacturing steps.

It is still another object of the present invention to provide a method for manufacturing a stripe-patterned metal plate, comprising manufacturing steps, each of which can easily be mechanized or automated.

It is further another object of the present invention to provide a method for manufacturing a rigid clad plate which is constructed of a matrix plate and the above described stripe-patterned metal plate placed thereon, said metal plates being integrally bonded to each other.

According to the present invention, there is provided a method for manufacturing a stripe-patterned metal plate comprising the steps of: placing plural kinds of metal sheet blanks having different colors on top of one another to provide a layer structure of said sheet blanks in an alternate order or in a predetermined order of arrangement; bonding the respective metal sheet blanks to each other directly and metallurgically in a solid state to provide a layer-structured plate; cutting said layer-structured plate in a direction along a face extending at a predetermined angle to a layer face thereof to provide at least one thin metal plate intermediate; inserting said metal plate intermediate into an elongated hole of a rectangular cross-section formed longitudinally through an elongated solid package of metal, said metal plate intermediate being substantially equal in cross-section to said hole in said package, said package having substantially the same thermal deformation properties as said layer-structured plate; and hot rolling said package into a predetermined length with its width remaining substantially unchanged so that said metal plate intermediate is simultaneously extended at a predetermined reduction rate with its width remaining substantially unchanged, the cut face of said metal plate intermediate being disposed in a horizontal direction.

Other objects and advantageous features of the present invention will be apparent from the following description which is made with reference to the accompanying drawings.

BRIEF DESCRIPTION OF THE ACCOMPANYING DRAWINGS

Now the present invention will be described in more details with reference to the accompanying drawings which illustrate the process of manufacturing a stripe-patterned metal plate in accordance with the present invention, in which:

FIG. 10 is a perspective view of a layer structure comprising three kinds of metal sheet blanks placed one upon another;

FIG. 11 is a perspective view of a lower block of a package;

FIG. 12 is a perspective view of the lower block, showing a metal plate intermediate received in a groove or hole formed in the lower block;

FIG. 13 is a perspective view of the package, showing an upper block bonded onto the lower block;

DETAILED DESCRIPTION OF PREFERRED EMBODIMENTS OF THE INVENTION

EXAMPLE 1

Figure 1:
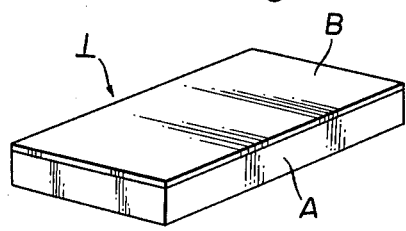
FIG. 1 is a perspective view of a clad plate provided in accordance with the first example of the conventional manufacturing method.
Figure 2:
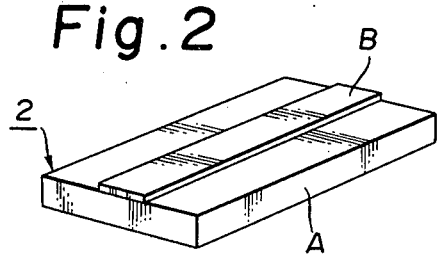
FIG. 2 is a perspective view of a clad plate provided in accordance with the second example of the conventional manufacturing method.
Figure 3:
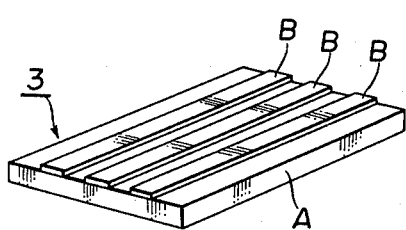
FIG. 3 is a perspective view of a clad plate provided in accordance with the third example of the conventional manufacturing method.
Figure 4:
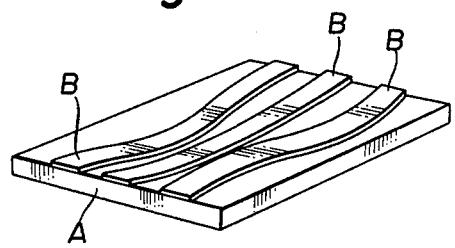
FIG. 4 is a perspective view of a clad plate as shown in FIG. 3 having cladding plates placed thereon, which are deformed into a snaking pattern by the rolling operation to which the clad plate was subjected.
Figure 5:
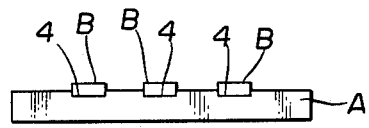
FIG. 5 is an end view of a modified clad plate similar to that in FIG. 3 provided in accordance with the fourth example of the conventional manufacturing method, on which a plurality of grooves are formed so as to prevent any deformation or distortion of the cladding plates as shown in FIG. 4.
Figure 6:
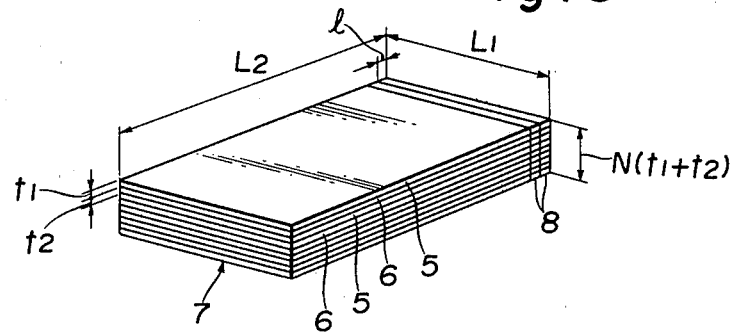
FIG. 6 is a perspective view of a stripe-patterned metal plate layer structure comprising two kinds of metal sheet blanks placed one above another and integrally bonded to each other in accordance with the present invention.

Referring to FIG. 6, a layer structure is shown, which is constructed of a plurality of metal sheet blanks of two kinds placed alternately one above another: 12 metal sheet blanks 5 of JIS SUS 304 stainless steel, while the other being 12 sheets of metal sheet blanks 6 of oxygen-free copper. Next, said layer structure comprising two kinds of metal sheet blanks placed one above another is subjected to not rolling at the conditions of about 900° C. preheating temperature and about 50% reduction rate so as to produce an integrally bonded layer-structured plate 7 which has dimensions of $L_1$: 100 mm, $L_2$: 200 mm, $t_1$: 2 mm and $t_2$: 2 mm. Then, a cutting operation is conducted with the integrally bonded layer-structured plate 7 in the direction along a face extending at a right angle to the layer face thereof to form a metal plate intermediate 8 having a width of 2.5 mm.

Figure 7:
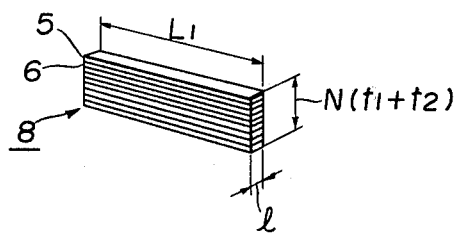
FIG. 7 is a perspective view of a metal plate intermediate cut to the predetermined width from the integrally bonded layer-structured plate in FIG. 6.

When said metal plate intermediate 8 was cut to size as illustrated in FIG. 7, this plate intermediate 8 has dimensions of L: 100 mm, l: 2.5 mm and N ($t_1+t_2$): 48 mm.

Then the metal plate intermediate 8 is turned down by 90 degrees and is subjected to cold rolling at 60% rolling rate so that a stripe-patterned metal plate 9 having a thickness of l': 1.0 mm is produced.

After cold rolling, the resultant stripe-patterned metal plate 9 has a striped appearance, the white colour generated by the metal sheet blanks 5 of JIS SUS 304 stainless steel and the red colour generated by the metal sheet blanks 6 of oxygen-free copper are alternately located in a stripe pattern.

EXAMPLE 2

A layer structure as illustrated in FIG. 6 is prepared, it being constructed of a plurality of metal sheet blanks of two kinds placed alternately one above another: 25 sheets of metal sheet blanks 5 of white gold having a chemical composition of about 50% Au, 50% Ni: 25 shets of metal sheet blanks 6 of 12 K gold alloy having a chemical composition of about 50% Au, 35% Cu, 10% Ag and 5% Zn. Then said layer structure is held at a temperture of about 750° C. for 1 hour in a relative vacuum of $10^{-3}$ torr at a pressure of 0.5 kg/mm² applied thereto so as to allow the respective metal sheet blanks to secure to each other by way of diffusive bonding, so that an integrally bonded layer-structured plate 7 having dimensions of $L_1$: 25 mm, $L_2$: 25 mm, t: 0.5 mm and T: 0.5 mm is produced (see FIG. 6). Then a metal intermediate 8 having a width of 2.5 mm is taken from the layer-structured plate 7 by carrying out a cutting operation with said layer-structured plate 7 in the direction along a face extending at a right angle to the layer face thereof (see FIG. 7).

The resultant metal plate intermediate 8 has dimensions of $L_1$: 25 mm, l: 2.5 mm and N ($t_1+t_2$): 25 mm and is subjected to cold rolling operation at about 90% rolling rate. As a result, a stripe-patterned metal plate 9 having a thickness of 0.25 mm is obtained, which has an appearance such that the white colour generated by white gold and yellow colour generated by 12 K gold alloy are alternately mixed (see FIG. 8).

EXAMPLE 3

First, a layer structure is prepared, which is constructed of two kinds of metal sheet blanks placed alternately one above another, one being 25 sheets of metal sheet blank 5 of JIS SUS 316 L stainless steel, while the other being 25 sheets of metal sheet blank 6 of 12 K gold alloy having the same chemical composition as in the preceding Example 2. Then the layer structure is placed in a 2,000 tons press and is subjected to hot pressing at the conditions of about 730° C. preheating temperature and 50% reduction rate so as to allow the respective metal sheet blanks to be secured to each other, so that an integrally bonded layer-structured metal 7 having dimensions of $L_1$: 50 mm, $L_2$: 50 mm, $t_1$: 3 mm and $t_2$: 1 mm is provided (see FIG. 6). Next, a metal plate intermediate 8 having a width of 2 mm is taken from said layer-structured plate 7 in the same manner as in Examples 1 and 2 (see FIG. 7).

Figure 8:
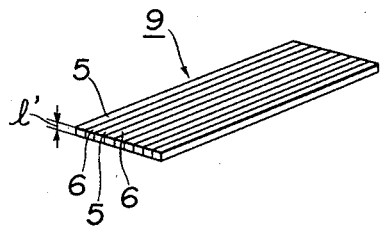
FIG. 8 is a perspective view of the required stripe-patterned metal plate manufactured in accordance with the present invention.
Figure 9:
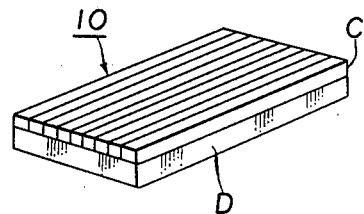
FIG. 9 is a perspective view of a clad plate with the stripe-patterned metal plate manufactured in accordance with the invention placed thereon as a cladding plate.

Then the metal plate intermediate 8 having dimensions of $L_1$: 50 mm, l: 2.0 mm and N $(t_1+t_2)$: 100 mm is subjected to cold rolling at about 75% rolling rate, so that the required stripe-patterned metal plate 9 is produced, which has an appearance such that white and yellow colours are alternately mixed in a stripe pattern (see FIG. 8).

EXAMPLE 4

Two 18 K gold alloy sheets 20 (75% Au-12.5% Ag-12.5% Cu) of yellow color, two 18 K gold alloy sheets 21 (75% Au-3.0% Ag-7.0% Ni-15.0% Pd) of white color and one 18 K gold alloy sheet 22 (75% Au-5.0% Ag-20% Cu) of red color were stacked one upon another in a manner shown in FIG. 10 to provide a layer structure 23. Each metal sheet was 100 mm in length, 50 mm in width and 1.1 mm in thickness. Then, the layer structure of the metal sheets 20, 21, 22 was heated at 700° C. for 60 minutes in a relative vacuum of $10^{-5}$ torr at a pressure of 2.0 kg/mm$^2$ so that an integrally bonded layer-structured plate was obtained through the interdiffusion between the metal sheets. The overall thickness of the thus obtained layer-structured plate was 5.0 mm. Then, the layer-structured plate was cut in the manner described in Example 1 to provide a metal plate intermediate 24 (5.0×5.0×100 mm) (FIG. 12). Then, the metal plate intermediate was inserted into a groove or hole 25 of a rectangular lower block 26 of a package 27 (FIGS. 11 and 12) with the cut face thereof disposed in contact with the bottom of the groove 25. The lower block 26 was made of soft steel. The lower block 26 had the following dimensions:

$T_1$ (thickness) = 10.5 mm
L (length) = 150 mm
$W_1$ (width) = 110 mm
The groove 25 had the following dimensions:
$T_2$ (depth) = 5.0 mm (tolerance: +2/100 mm)
$W_2$ (width) = 5.0 mm (tolerance: +2/100 mm)

A pair of end pieces 28, 28 of soft steel were inserted into the groove 25 of the lower block 26 and disposed in abutment against the opposite ends of the metal plate intermediate, respectively, the outer end faces of the two end pieces 28, 28 lying flush with the opposite end faces of the lower block 26, respectively, Then, an upper block 29 of the package 27 was placed on the lower block 26 (FIG. 13), the upper block 29 being made of soft steel and having the same dimensions as the lower block 26 but having no groove. Then, the upper and lower blocks 29 and 26 of the package 27 were bonded together by Tig-welding the peripheral line of connection as shown at 30. Each of the end pieces 28, 28 was also Tig-welded to the upper and lower blocks 29 and 26 as at 31. Prior to the placing the upper block 29 on the lower block 26, a release agent was applied to the groove 25 and the upper surface of the lower block 26 with which the lower surface of the uppe block 29 was to be mated. Then, the package 29 containing the metal plate intermediate was heated at 650° C. and hot rolled at a reduction rate of 15 to 20%. This procedure was repeated so that the package was finally reduced to a thickness of 4.20 mm. During the hot rolling, the metal plate intermediate was pressed into a stripe-patterned composite material. Then, the peripheral welding line of the upper and lower blocks 29 and 26 was cut to disconnect them so that the stripe-patterned composite material was removed therefrom. The resultant composite material has been formed to predetermined dimensional accuracy (width: 5.0 mm-tolerance: +2/100 mm; thickness: 1.0 mm-tolerance: +2/100 mm). No serpentine deformation and twisting were found in the sripes of the composite material through visual observation.

EXAMPLE 5

Figure 14:
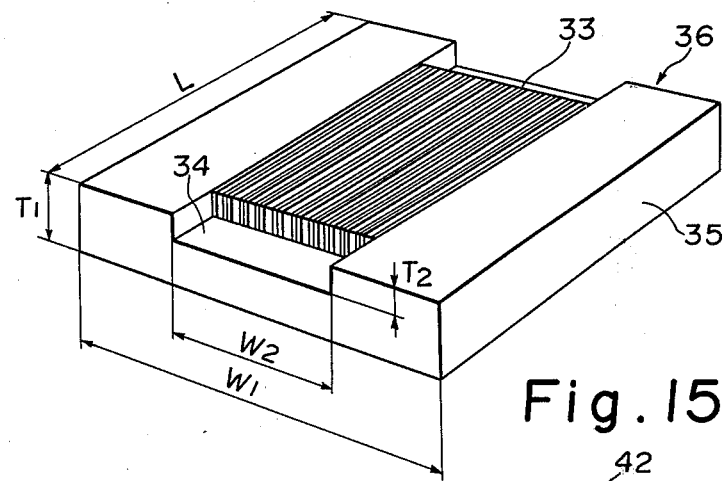
FIG. 14 is a view similar to FIG. 12 but showing a modified lower block.

Twenty-five 18 K gold alloy sheets (75% Au-10% Ag-15.0% Cu) of yellow color and twenty-five 18 K gold alloy sheets (75% Au-5.0% Ag-20% Pd) of white color were stacked in an alternate fashion to provide a layer structure. Each metal sheet was 100 mm in length, 50 mm in width and 0.6 mm in thickness. Then, the layer structure of the metal sheets was heated at 720° C. for 120 minutes in a relative vacuum of $10^{-5}$ torr at a pressure of 2.0 kg/mm$^2$ so that an integrally bonded layer-structured plate was obtained through the interdiffusion between the metal sheets. The overall thickness of the thus obtained layer-structured plate was 25 mm. Then, the layer-structured plate was cut in the manner described in Example 1 to provide a metal plate intermediate 33 (25×5.0×100 mm). The metal plate intermediate was inserted into a groove or hole 34 of a rectangular lower block 35 of a package 36 (FIG. 14) with the cut face thereof disposed in contact with the bottom of the groove 34. The lower block 35 was made of soft steel. The lower block had the following dimensions:

$T_1$ (thickness) = 10.5 mm
L (length) = 150 mm
$W_1$ (width) = 110 mm
The groove 34 had the following dimensions:
$T_2$ (depth) = 5.0 mm (tolerance: +2/100 mm)
$W_2$ (width) = 25.0 mm (tolerance: +2/100 mm)

As described above for Example 4, a pair of end pieces (not shown) and an upper block (not shown) of the package 36 are arranged relative to the lower block 35, and the upper and lower blocks of identical size and the two end pieces were bonded by Tig welding. The upper block and the end pieces were made of soft steel. A release agent was applied before the placing of the upper block on the lower block, as described above for Example 4. Then, the package containing the metal plate intermediate was heated at 650° C. and hot rolled at a reduction rate of 20%. This procedure was repeated so that the package was finally reduced to a thickness of 4.20 mm. Then, the upper and lower blocks were disconnected as described above for Example 4 so that a stripe-patterned composite material was removed therefrom. The resultant composite material had been formed to predetermined dimensional accuracy (width 25 mm-tolerance: +2/100 mm; thickness: 1.0 mm-tolerance: ±2/100 mm). No serpentine deformation and twisting were found in the stripes of the composite material through visual observation.

EXAMPLE 6

Figure 15:
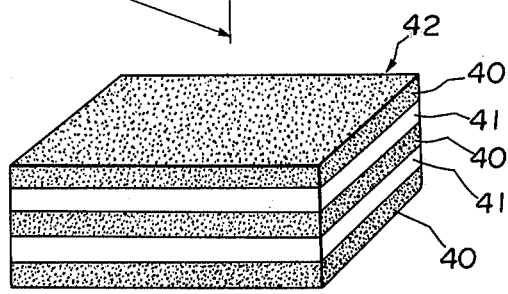
FIG. 15 is a view similar to FIG. 10 but showing another layer structure comprising two kinds of metal sheet blanks placed one upon another.
Figure 16:
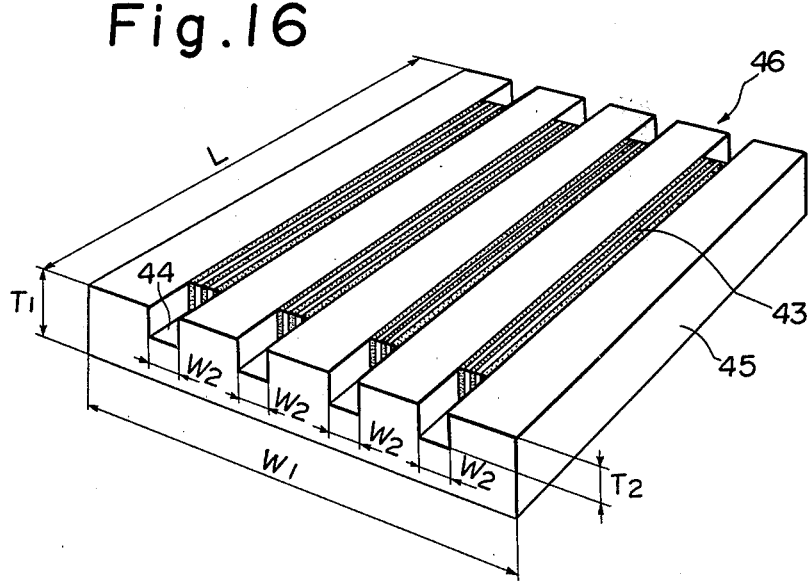
FIG. 16 is a view similar to FIG. 12 but showing another modified lower block having a plurality of grooves.

Three 18 K gold alloy sheets 40 (75% Au-10% Ag-15.0% Cu) of yellow color and two 18 K gold alloy sheets 41 (75% Au-5.0% Ag-20% Pd) were stacked in an alternate fashion to provide a layer structure 42 (FIG. 15). Each metal sheet was 100 mm in length, 50 mm in width and 1.1 mm in thickness. Then, the layer structure of the metal sheets 40, 41 was heated at 700° C. for 60 minutes in a relative vacuum of $10^{-5}$ torr at a pressure of 2.0 kg/mm$^2$ so that an integrally bonded layer-structured plate was obtained through the interdiffusion between the metal sheets. The overall thickness of the thus obtained layer-structured plate was 5.0 mm. Then, the layer-structured plate was cut in the manner described in Example 1 to provide a plurality of metal plate intermdiates 43 (5.0×5.0×100 mm). Four metal plate intermediates 43 thus obtained were inserted respectively into four parallel grooves or holes 44 of a rectangular lower block 45 of a package 46 with their cut faces disposed in contact with the bottoms of the respective grooves 44. The lower block was made of soft steel. The lower block 45 had the following dimensions:

$T_1$ (thickness) = 10.5 mm
L (length) = 200 mm
$W_1$ (width) = 130 mm

Each of the grooves 44 had the following dimensions:

$T_2$ (depth) = 5.0 mm (tolerance: +2/100 mm)
$W_2$ (width) = 5.0 mm (tolerance: +2/100 mm)

As described above for Example 4, end pieces (not shown) and an upper block (not shown) of the package 46 are arranged relative to the lower block 45, and the upper and lower blocks and the end pieces were bonded together by Tig welding. The upper and lower blocks of identical size and the end pieces were made of soft steel. A release agent was applied before the placing of the upper block on the lower block, as described above for Example 4. Then, the package 46 containing the metal plate intermediates 43 was heated at 650° C. and hot rolled at a reduction rate of 20%. This procedure was repeated so that the package was finally reduced to a thickness of 4.20 mm. Then, the upper and lower blocks were disconnected as described above for Example 4 so that a stripe-patterned composite material was removed therefrom. The resultant composite material had been formed to predetermined dimensional accuracy (width: 5 mm-tolerance: +2/100 mm; thickness: 1.0 mm-tolerance: ±2/100 mm). No serpentine deformation and twisting were found in the stripes of the composite material through visual observation.

Since the upper and lower blocks of the package and the end pieces received in the groove or grooves of the lower block have the same thermal deformation properties as the metal plate intermediate, the metal plate intermediate is extended uniformly by the hot rolling into a predetermined length with its width remaining substantially unchanged. The metal plate intermediate is of a relatively small size, and therefore if the metal plate intermediate is to be hot rolled without the use of the package of soft steel, it tends to be cooled rapidly and cannot be maintained at a required temperature during the hot rolling. Thus, the package has the additional advantage that it serves to maintain the metal plate intermediate at the required temperature during the hot rolling. Further, as described above, by virtue of the provision of the package, the stripes of the resultant stripe-patterned composite material are not subjected to serpentine deformation and twisting. Also, due to the provision of the package, the metal plate intermediate of a rectangular cross-section is advantageously rolled into a rectangular cross-section. Thus, the package prevents the metal plate intermediate from being rolled into a rhombic cross-section.

Instead of the interdiffusion bonding, the layer structure of the metal sheets in Examples 4 to 6 may be hot rolled into the integrally bonded layer-structured plate.

It is to be noted that besides the aforesaid kinds of metal sheet blank in Examples 1 to 6, mild steel, Ni, Ni alloy, Al, Al alloy, Ti, Ti alloy, cupro-nickel, Monel metal, nickel silver, Ag, Ag alloy and others are applicable for metal material from which white colour is generated. Au, Au alloy, brass, aluminum bronze and other are for red coloured metal material and Cu, Cu alloy and others are for yellow coloured metal material.

Further it should be of course understood that another type of stripe-patterned metal plate or composite material may be manufactured by stacking more than four kinds of metal sheets of different colours in a regular or irregular fashion.

Additionally in accordance with another aspect of the present invention it is possible to manufacture a clad plate 10 with the stripe-patterned metal plate or composite material C securely located thereon as a cladding material, said stripe-patterned metal plate C being manufactured in the above described Examples 1 to 6. Cladding is effected in such a manner that the stripe-patterned metal plate in Example 1 is placed on a matrix plate D of JIS SUS 304 stainless steel and the layer assembly of the metal plates is subjected to rolling. The stripe-patterned metal plate in Example 2 is placed on a matrix plate D of JIS SUS 304 stainless steel and then the layer assembly is subjected to soldering. The stripe-patterned metal plate in Example 3 is placed on a matrix plate D of JIS SUS 316 L stainless steel and then the layer assembly is subjected to soldering. The stripe-patterned metal plate or composite material produced according to the procedure in Examples 4 to 6 is bonded to a matrix or substrate plate D of JIS SUS 304 or 306 L stainless steel by rolling or soldering.

What is claimed is:

1. A method for manufacturing a stripe-patterned metal plate comprising the steps of:

placing plural kinds of metal sheet blanks having different colors on top of one another to provide a layer structure of said sheet blanks in an alternate order or in a predetermined order of arrangement;

bonding the respective metal sheet blanks to each other directly and metallurigically in a solid state to provide a layer-structured plate;

cutting said layer-structured plate in a direction along a face extending at a predetermined angle to a layer face thereof to provide at least one thin metal plate intermediate;

inserting said metal plate intermediate into an elongated hole of a rectangular cross-section formed longitudinally through an elongated solid package of metal, said metal plate intermediate being substantially equal in cross-section to said hole in said package, said package having substantially the same thermal deformation properties as said layer-structured plate; and hot rolling said package into a predetermined length with its width remaining substantially unchanged so that said metal plate intermediate is simultaneously extended at a predetermined reduction rate with its width remaining substantially unchanged, the cut fact of said metal plate intermediate being disposed in a horizontal direction.

2. A method for manufacturing a stripe-patterned metal plate as set forth in claim 1, in which said package comprises a pair of upper and lower rectangular blocks of identical configuration, said upper and lower blocks being bonded together with the opposed faces being mated together, said lower block having said hole extending along the length thereof and disposed centrally of the width thereof, said hole being formed in the upper face of said lower block which is mated with the lower face of said upper block.

3. A method for manufacturing a stripe-patterned metal plate as set forth in claim 2, in which each of said upper and lower blocks has a length L, a width $W_1$ and a depth $T_1$, said hole having a width $W_2$ and a depth $T_2$, wherein $W_1 \leq L \leq 2W_1$, $W_1 \geq 10T_1$, $T_1 \geq 2T_2$ and $W_1 \geq W_2$.

4. A method for manufacturing a stripe-patterned metal plate as set forth in claim 2, in which said upper and lower blocks are bonded together by welding.

5. A method for manufacturing a stripe-patterned metal plate, as set forth in claim 1 in which the layer structure comprises at least one 18 K gold alloy sheet (75% Au-10% Ag-15.0% Cu) of yellow color and at least one 18 k gold alloy sheet (75% Au-5.0% Ag-20% Pd) of white color.

6. A method for manufacturing a stripe-patterned metal plate, as set forth in claim 1 in which the layer structure comprises at least one 18 K gold alloy sheet (75% Au-12.5% Ag-12.5% Cu) of yellow color, at least one 18 K gold alloy sheet (75% Au-3.0% Ag-7.0% Ni-15.0% Pd) of white color and at least one 18 K gold alloy sheet (75% Au-5.0% Ag-20% Cu) of red color.

7. A method for manufacturing a stripe-patterned metal plate as set forth in claim 1, in which said bonding of the metal sheet blank is carried out by hot rolling.

8. A method for manufacturing a stripe-patterned metal plate as set forth in claim 1, in which said bonding of the metal sheet blanks is carried out by heating said metal sheel blanks at 700° C. for 60 minutes in a relative vacuum of $10^{-5}$ torr at a pressure of 2.0 kg/mm² so that the integrally bonded layer-structured plate is obtained through the intendiffusion between the metal sheets.

9. A method for manufacturing a stripe-patterned metal plate as set forth in claim 1, in which said bonding of the metal sheet blanks is carried out by heating said metal sheet blanks at 720° C. for 120 minutes in a relative vacuum of $10^{-5}$ torr at a pressure of 2.0 kg/mm² so that the integrally bonded layer-structured plate is obtained through the interdiffusion between the metal sheets.

10. A method for manufacturing a stripe-patterned metal plate as set forth in claim 1, incliuding the further steps of separating the hot rolled plate intermediate from said package, placing said plate intermediate as a cladding plate onto a substrate plate of stainless steel, and integrally bonding both metal plates to each other to form a strip-patterned clad plate.

11. A method for manufacturing a clad plate as set forth in claim 10, in which said cladding plte is bonded to said substrate plate by rolling.

12. A method for manufacturing a clad plate as set forth in claim 10, in which said cladding plate is bonded to said substrate plate by soldering.

* * * * *